Oct. 10, 1933.  J. A. CHRISTIAN  1,929,772
HANDLE DEVICE
Filed April 2, 1931
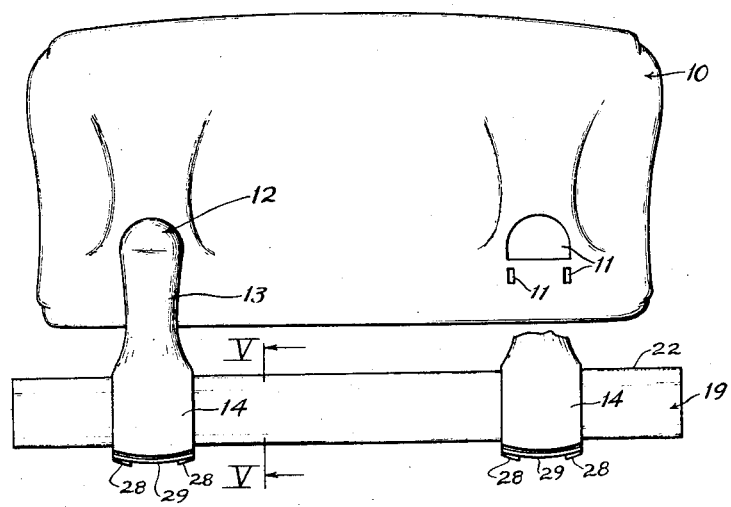
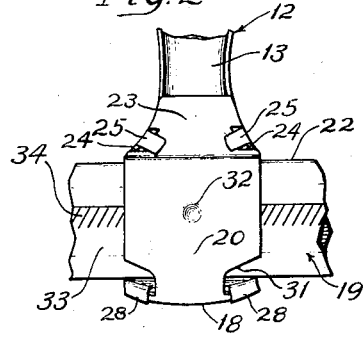
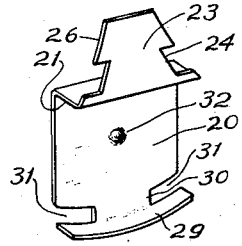
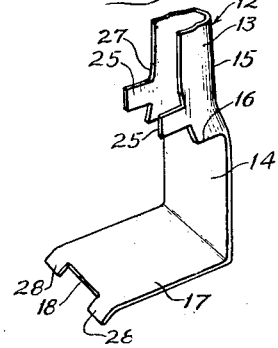
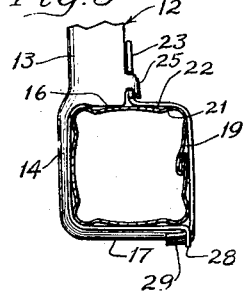
Inventor:
Joseph A. Christian
By Harry C. Alberts
Atty.

Patented Oct. 10, 1933

1,929,772

UNITED STATES PATENT OFFICE 1,929,772

HANDLE DEVICE

Joseph A. Christian, Maywood, Ill.

Application April 2, 1931. Serial No. 527,106

1 Claim. (Cl. 16—112)

This invention relates to handle members and more particularly to casket handles, although certain features thereof may be employed with equal advantage for other purposes.

It contemplates more especially the provision of improved means for the permanent application of arms to handle bars without resort to expensive or intricate fastening expedients.

One object of the present invention is to simplify the construction and improve the operation of devices of the character mentioned.

Another object is to provide improved means for permanently attaching handle arms to grip bars without resorting to extensive labor or expensive attachments.

A further object is the provision of complemental arm members for the frictional application thereof to grip bars without distortion.

A still further object is to provide rigid complemental members for the reception of a grip bar therethrough and the permanent attachment thereof by deformation of their joining expedients.

Still a further object is to provide a rigid handle arm having tangs stamped therefrom as a complement to a rigid plate for permanent engaged assembly with a grip bar responsive to deformation of the tangs.

Other objects and advantages will appear from the following description of an illustrative embodiment of the present invention.

In the drawing:

Figure 1 is a front view in elevation of a casket plate having a handle arm and grip bar operatively connected thereto.

Figure 2 is a fragmentary rear view of the handle arm and plate assembled in engaged assembly with a grip bar.

Figure 3 is a perspective view of a plate member embodying features of the present invention.

Figure 4 is a fragmentary perspective view of a handle arm embodying features of the present invention and formed as a complement to the plate shown in Figure 3.

Figure 5 is a sectional view taken substantially along line V—V of Figure 1.

The structure selected for illustration comprises a metallic plate 10 stamped or otherwise shaped to present any desired or suitable configuration. The plate 10 is suitably punched or otherwise processed to provide apertures 11 for the pivotal reception of handle arms 12. The handle arms 12, in this instance two, are preferably pressed from sheet material to provide a tubular shank 13 which is well rounded to impart the desired or necessary stiffness and rigidity thereto.

As shown, the shank 13 of the handle arm 12 terminates in a flat portion 14 distended from the median line of the shank 13 for a distance somewhat beyond the exterior surface 15 thereof. In consequence thereof, a grip bar engaging shoulder 16 constitutes the edge of the handle arm shank 13 to confront a jaw plate 17 disposed in parallelism therewith. The jaw plate 17 is provided with a slight convex portion 18 and is bent from the flat portion 14 to extend rearwardly therefrom a distance approximating the width of a grip bar 19 designed to rest thereon. It is apparent, therefore, that the grip bar 19 will be lodged between the shoulder 16 and the jaw plate 17 in spaced parallelism therewith to conform substantially to the dimension of the grip bar 19, in this instance of square cross section, so as to be in partial embrace thereof.

In order to retain the grip bar 19 in position, a plate 20 is stamped from sheet material to provide a shoulder 21 for rest on the top side 22 of the grip bar 19 as an extension of the shoulder 16. A tongue 23 extends vertically upward from the shoulder 21 in parallelism with the face of the plate 20, it being provided with notches 24 in the sides thereof for complemental reception of substantially correspondingly shaped tangs 25 constituting integral transverse extensions of the handle arm shank 13. It is to be noted that the edges 26 of the tongue 23 are inclined for convergence to substantially conform with the side curvature 27 of the handle arm 12 which is stamped so that the edges thereof will define the tangs 25 for extension therefrom.

In order to effect the attachment of the plate 20 to the jaw plate 17, the latter has the edge thereof provided with extending pre-deformed tangs 28 which are bent downwardly for engagement of an edge flange 29. The flange 29 is curved to correspond with the edge 18 of the handle arm jaw plate 17, and constitutes an integral portion of the plate 20 for connection thereto by an extension 30. The extension 30 is reduced in width from the plate 20 to present or design side notches or openings 31 therein for the reception of the jaw tangs 28.

With this arrangement, it will be apparent that the plate 20 is complemental to the flat portion 14 of the handle arm 12 so as to completely embrace the grip bar 19. The bent jaw tangs 28 extend through the side openings 31 in the plate 20 for rest on the flange 29 which yields responsive to the tensional embrace of the grip bar 19, and thereupon the notches 24 receive the handle arm tangs 25 which are readily bent (Figure 2) in any suitable manner as commercial practice may dictate for permanent attachment to the handle arm 12 and assembled engagement with the grip bar 19.

In order to increase the frictional reaction between the plate 20 and grip bar 19, the former is provided with an inwardly projecting cavity or indentation 32 pressed or otherwise provided therein for frictional contact with the side surface 33 of the grip bar 19. In order to preclude any possible relative movement between the grip bar 19 and the attached handle arm 12, corrugations or other expedients are provided in the grip bar 19 to define a roughened surface line 34 in alignment with the indentation 32 which contacts therewith. This precludes any possible slip even responsive to substantial impacts, and it is possible to effect permanent attachment of the handle arm 12 to the grip bar 19 without distorting the plate 20 or marring the contour of the grip bar 19. Moreover, the handle arm 12 and its cooperating plate 20 are capable of formation by stamping operations to the end of minimizing the expense of production and the cost of assembly.

Various changes may be made in the embodiment of the invention herein specifically described without departing from or sacrificing any of the advantages of the invention as defined in the appended claim.

I claim:

The combination with a handle-bar, of a hanger-arm having a jaw plate for partial embrace of said bar, a rigid permanently pressed locking plate complemental to said jaw plate and hanger-arm for cooperation therewith to embrace a portion of said handle-bar, there being notches in said locking plate in communication with the edges thereof, pre-deformed tangs on said jaw plate for registry with certain of said locking plate notches, another set of tangs on said hanger-arm for registry with the remaining notches of said locking plate to effect permanent engagement thereof with said jaw plate and hanger-arm responsive to the deformation of said last named tangs, said first named pre-deformed tangs establishing permanent connection without further deformation, and said last named tangs effecting locking engagement responsive to deformation subsequent to initial locking engagement of said first named pre-deformed tangs.

JOSEPH A. CHRISTIAN.